(No Model.) 2 Sheets—Sheet 2.
C. A. JOHANSSON.
CENTRIFUGAL BUTTER EXTRACTOR.
No. 406,171. Patented July 2, 1889.
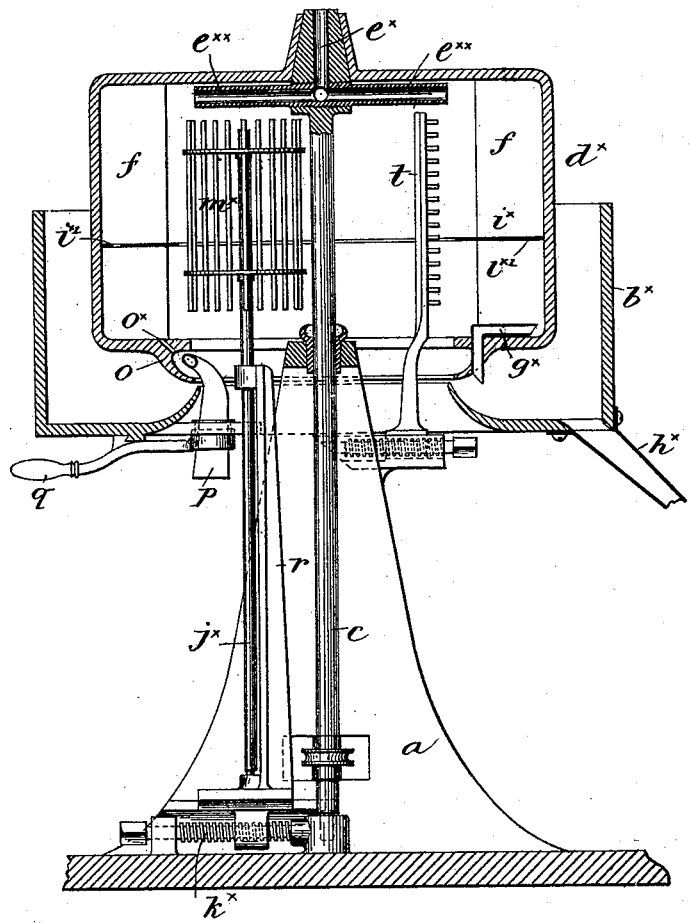
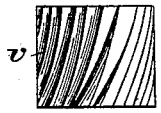
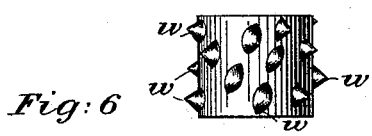
WITNESSES:
INVENTOR:
Carl A. Johansson
By Henry Connett
Attorney.

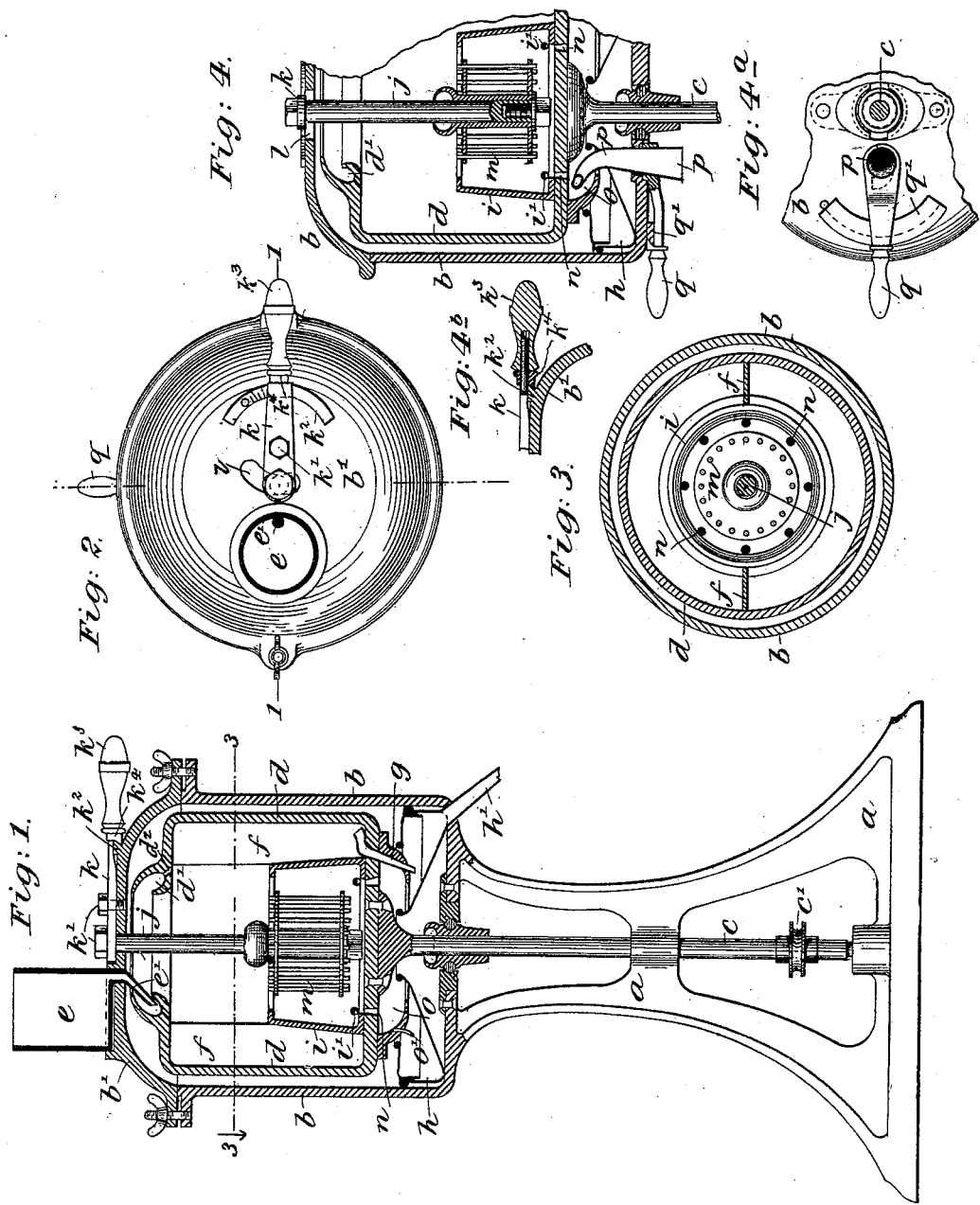

UNITED STATES PATENT OFFICE.

CARL AUGUST JOHANSSON, OF STOCKHOLM, SWEDEN, ASSIGNOR TO THE AKTIEBOLAGET EXTRAKTOR, OF SAME PLACE.

CENTRIFUGAL BUTTER-EXTRACTOR.

SPECIFICATION forming part of Letters Patent No. 406,171, dated July 2, 1889.

Application filed February 14, 1889. Serial No. 299,855. (No model.) Patented in Sweden January 21, 1887, No. 1,053; in England March 15, 1888, No. 3,994; in Norway May 24, 1888, No. 1,022; in France May 29, 1888, No. 190,886; in Belgium May 31, 1888, No. 81,987; in Finland June 8, 1888, No. 311, and in New South Wales August 2, 1888, No. 826.

*To all whom it may concern:*

Be it known that I, CARL AUGUST JOHANSSON, a subject of the King of Sweden, and a resident of Stockholm, Sweden, have invented certain Improvements in Centrifugal Butter-Extractors, (for which patents have been granted in Sweden, No. 1,053, dated January 21, 1887; in Finland, No. 311, dated June 8, 1888; in England, No. 3,994, dated March 15, 1888; in France, No. 190,886, dated May 29, 1888; in Belgium, No. 81,987, dated May 31, 1888; in New South Wales, No. 826, dated August 2, 1888, and in Norway, No. 1,022, dated May 24, 1888,) of which the following is a specification.

My invention relates to a centrifugal apparatus to be employed for extracting butter from milk by a continuous process, said apparatus being especially adapted for carrying out or working the process described and claimed in my Letters Patent No. 399,618, dated March 12, 1889.

The object of my present invention is, in part, to provide the centrifugal apparatus with an adjustable cream disturber or divider which shall be capable of imparting to the cream wall only a degree of disturbance sufficient to free the particles of blue milk incarcerated by the butter globules or particles in the cream, in part to provide means for separating the cream from the main portion of the blue milk, and in part to provide means for gathering the extracted butter and for leading or conveying it away.

My invention will be hereinafter fully described, and its novel features carefully defined in the claims.

In the drawings which serve to illustrate my invention, I have shown it embodied in two forms of apparatus differing only in some details.

Figures 1, 2, 3, and 4 illustrate the most approved form of the apparatus. In these views, Fig. 1 is a vertical axial sectional elevation taken in the plane indicated by line 1 1 in Fig. 2. Fig. 2 is a plan of the apparatus. Fig. 3 is a horizontal sectional plan taken in the plane indicated by line 3 3 in Fig. 1; and Fig. 4 is a fragmentary axial section of the upper part of the apparatus, taken in a plane at right angles to line 1 1 in Fig. 2. Fig. $4^a$ is a fragmentary view of the under side of the apparatus, and Fig. $4^b$ is a detached detail view. The features illustrated in these views will be hereinafter fully described. Fig. 5 is a sectional elevation similar to Fig. 1, illustrating another form of the apparatus embodying my invention. Figs. 6, 7, $7^a$, 8, and 9 are views illustrating modified forms of the device for disturbing the cream wall or layer.

I will first describe the preferred form of apparatus illustrated in Figs. 1 to 4.

$a$ is a suitable base or support, on which is mounted an outer fixed casing $b$, which is provided with a removable cover $b'$. This cover may be held in place by means of screws and thumb-nuts, as represented, or by other suitable means. In the support $a$ is rotatively mounted an upright shaft $c$, which is provided with a driving pulley or sheave $c'$ of the usual or any kind. This shaft $c$ has a bearing in the bottom of the casing $b$, and on the upper end of said shaft, within the casing, is securely fixed a drum $d$, which forms the major element of the centrifugal apparatus. This drum receives the milk from above through the medium of a vessel $e$, mounted on the cover $b'$ and provided with a bent discharge-spout $e'$, which passes down through an aperture in the cover $b'$ and enters an annular channel $d'$, formed in the upper lip or margin of the drum $d$. This vessel $e$ serves the purpose of a funnel, and it may be made from ordinary thin sheet metal.

When the drum $d$ is set in motion and is revolving at from six thousand to eight thousand revolutions per minute, the milk, which will be perfectly fresh, by preference, is admitted in a continuous but regulated stream to the vessel $e$, from which it flows to the channel $d'$. It overflows from this channel, and being acted upon by combined centrifugal force and gravity the milk flows to the outer wall of the drum $d$ and down the same, the radial blades $f$, commonly found in the drums of centrifugal apparatus, serving to compel the liquid to partake of the rotation of the drum. In its downward movement the cream will be separated from the major part of the blue milk, and the latter will eventually find its way out of the drum at a pipe $g$, mounted in the bottom of the drum, (see Fig. 1,) its lower end depending into a milk-receiver $h$ in the form of an annular chamber which rests on the bottom of the casing $b$, and is left unattached, by preference, in order that it may be conveniently removed for cleaning. The blue milk flows from the receiver $h$ through a spout $h'$, which passes through an aperture in the casing. It will be noted that the pipe $g$ is arranged so as to receive the blue milk at a point close to the outer wall of the revolving drum. As the milk descends in the drum $d$, the blue milk will stand as a wall next to the wall of the drum, and the cream will form a wall inside of the same and superposed thereon. The cream will thus be separated from the blue milk by a substantially vertical or slightly-inclined annular partition $i$, which is concentric with the axis of the drum $d$, and which is secured to the bottom thereof, as seen in Fig. 1. The cream descends inside of this annular partition, which forms substantially an inner or secondary drum-wall, and while it is moving down, being constantly augmented from above, it is acted upon and disintegrated by a device I will now describe.

Suspended in the drum is a cylindrical arbor or shaft $j$, which is rigidly fixed at its upper end to a lever $k$, fulcrumed at $k'$ on the cover $b'$. The arbor $j$ passes out through a slot $l$ in the cover. On the shaft, at its lower inner end, is rotatively mounted a trundle-wheel $m$, which is or may be constructed of a sleeve slipped on the arbor $j$, two disk-like heads fixed at the proper distance apart to and on said sleeve, and staves extending from one of said disks to the other, as clearly shown. This wheel $m$ is seen in side elevation in Fig. 1 and in vertical section in Fig. 4. By shifting the lever $k$ on its fulcrum the periphery of wheel $m$ may be moved farther from or nearer to the axis of the drum.

When the cream begins to descend by gravity within the secondary wall or partition $i$, wheel $m$ is moved out until its periphery enters the cream wall. The rapidly-moving cream acts upon the staves or rungs of wheel $m$ and rotates said wheel rapidly on its arbor $j$. The entry of the staves into the body of the cream and their withdrawal therefrom effect such displacement and separation of the butter particles or globules, which form a large part of the cream, as to allow the particles of blue milk held or incarcerated by them to escape, and the centrifugal force drives said particles of blue milk outward to the wall or partition $i$, where they descend and eventually pass through apertures $i'$ $i'$ in said partition near its base and join the blue milk in the annular space exterior to the partition $i$. The particles of butter now coalesce and form a mass, which descends through apertures $n$ in the bottom of the drum $d$ into an inwardly-opening annular chamber $o$, formed on the bottom of the drum and rotating therewith. This chamber receives the butter, and the centrifugal force drives the latter into said chamber and against the outer wall thereof, thus causing it to be compacted and forcing out any small quantity of blue milk it may yet contain, said milk flowing through a pipe or pipes or small apertures $o'$ in the bottom of the annular chamber $o$ into the receiver $h$. One of these pipes $o'$ is shown in Fig. 1. There may be several of them, however.

The butter is removed from the annular butter-receiving chamber $o$ by means of a tube $p$. (Seen in Figs. 4 and 4$^a$.) This tube is bent laterally at its receiving end, and it is rotatively mounted in the bottom of the casing $b$. Its upper end passes through an opening formed in the receiver $h$. Its bent butter-receiving end is adapted to enter the annular butter-chamber $o$. In order that this bent receiving end of tube $p$ may be made to enter more or less deeply into the mass of compactly solid butter packed in chamber $o$, it is provided with a lever-like handle $q$, whereby the proper axial movement may be given to the tube in order to swing its laterally-projecting receiving end into said annular chamber; and in order that the butter may enter and force its way readily through said tube $p$ the receiving end or mouth of the tube is directed oppositely to that in which the drum $d$ is rotating. This end of the tube cuts out the butter, which then passes down through and out of the tube, its passage being facilitated by the enlarging or flaring of the tube toward its discharging end, as clearly shown. Such particles of butter as may descend with the blue milk into the annular space between the wall of drum $d$ and the partition $i$ will in course of time form a cream wall and be crowded inward and upward over the partition $i$, where said cream will join the main portion within the partition $i$.

The upper end of the tube $p$, through which the butter is removed, is bent in two directions—that is, it is bent outward laterally from the axis of the main part of the tube and then bent to form a lateral curve, which may be concentric with the said axis. This construction, by avoiding sharp angles, provides an easy and free passage for the butter, and it also enables the receiving end of the tube to be drawn back or advanced by the rotation of the tube on its axis. The lever $q$ is guided and steadied in its movements by means of a curved undercut guide $q'$, a part of the handle taking under said guide, as shown.

Fig. 4$^b$ illustrates the means employed for clamping the lever to the guide at the point at which it is set. On the end of the lever proper is formed a reduced screw-threaded stem, and the handle portion $k^3$ of the lever has a screw-threaded bore to receive this stem of the lever. That portion $k^4$ of the lever which takes under the overhang on the guide $k^2$ slides loosely on the reduced screw-threaded stem, and it may be forced up against said guide by screwing up the handle $k^3$ against it, so that it forms a brake. The handle of lever $q$ in Figs. 4 and $4^a$ will be provided with a similar brake; but Fig. $4^b$ will serve to illustrate it as well.

In Fig. 5 I have shown my invention embodied in part in an apparatus slightly differing from that last described. In this construction the casing $b^\times$ has no cover and the drum $d^\times$ is closed at the top, except as to the inlet $e^\times$ for the milk, which is axially arranged. The shaft $c$ extends up through the drum and the drum is open at its bottom. The milk entering at the inlet $e^\times$ flows outward through lateral tubular branches $e^{\times\times}$. In lieu of the upright annular partition $i$, the drum has a horizontal partition or annular shelf $i^\times$. The descending blue milk, which lies next the wall of the drum, sinks down through holes $i^{\times\prime}$ in said partition or shelf $i^\times$, said holes being near the drum-wall. It eventually passes out of the drum through a pipe $g^\times$ directly into the fixed casing $b^\times$, which is provided with an outlet-pipe $h^\times$. The cream flows over the inner edge of the shelf and is acted upon by a trundle-wheel $m^\times$, similar to that shown in Fig. 1; but in Fig. 5 this wheel is mounted on the upper end of a shaft $j^\times$, which is mounted in a suitable upright frame $r$. In order that the wheel $m^\times$ may be moved in or out radially in the drum, this frame $r$ is mounted to slide in suitable guides arranged at its base, and it has a screw $k^\times$, whereby the movement or adjustment may be effected. The butter as it sinks down flows over the margin of the opening in the bottom of the drum and into the butter-chamber $o$, from which it is continuously removed by a tube $p$, like that seen in Fig. 4.

If any small quantity of blue milk remains in the butter after the latter has reached the butter-receiving chamber $o$, it will be forced or squeezed out by the packing of the butter in said chamber, and will pass back into the drum by way of the passages $o^\times$, one of which is seen at the left in Fig. 5.

The milk-receiving annular recess or chamber $d'$ (seen in Figs. 1 and 4) may have one or more holes $d^2$ for the passage of the milk into the drum, if desired.

The wheel $m$ (seen in Figs. 1 and 4) may extend up higher, if desired, as represented in in Fig. 5, for example. The wheel is, I believe, the best device attainable for disturbing the cream wall to a sufficient extent to release the particles of blue milk contained therein; but measurably good results may be attained by other devices. For example, at the right in Fig. 5 I have shown an upright stationary comb $t$, arranged to stand erect into the drum, with its teeth projecting outwardly and adapted to enter the revolving cream wall. Several of these combs may be arranged in the drum, or one or more of the said combs may be used in connection with a trundle-wheel, as seen in Fig. 5; or, in lieu of the teeth of such a comb, horizontally-arranged tubes of conical form may be affixed to the stem of the comb at different heights, the advanced ends of which enter the cream wall or layer. This construction is sufficiently illustrated in plan in Fig. 6, wherein the tube $u$ is seen taking in the cream at its smaller end and delivering it at its larger end broken into spray.

Fig. 7 is a side view, and Fig. $7^a$ an end view, of a solid wheel $v$, with obliquely-arranged V-shaped external ribs to enter the cream layer. This wheel may be used in lieu of the trundle-wheel $m$ with fairly good results; or such a wheel may have conical irregularly-arranged spurs $w$, as represented in Fig. 8.

Fig. 9 represents another form of wheel provided with blades or arms arranged as shown.

Having thus described my invention, I claim—

1. In a centrifugal apparatus for the separation of butter from milk, the combination of the revolving drum provided with a partition arranged within it, which separates the cream layer from the layer of blue milk, and an adjustable cream-disturber, which is arranged within the drum and projects into the revolving layer of cream and breaks up the same, as set forth.

2. In a centrifugal apparatus for the separation of butter from milk, the combination of the revolving drum provided with an outlet at its bottom for the blue milk, and another outlet at its bottom for the butter separated from the milk, an annular butter-receiving chamber connected with and arranged below said drum, an adjustable butter-removing tube, the receiving end of which projects into said butter-receiving chamber, and a cream-disturber arranged within said drum and adapted to project into the cream layer or wall, as set forth.

3. The combination of the revolving drum $d$, provided with an upright annular partition concentric with the axis of the drum to separate the cream layer from the layer of blue milk, said partition having apertures in it near its base for the passage outward of such blue milk as may have passed over with the cream, and a cream-disturber arranged in said drum and within the space included within said partition.

4. The combination, with the fixed outer casing and the receiver for the blue milk arranged within said casing, of the revolving drum, the cream-disturber arranged therein, and the annular chamber $o$, fixed to the under side of said drum and receiving the butter therefrom, said butter-receiving chamber having an outlet opening into the blue-milk receiver for the passage of such blue milk as may be pressed out of the butter in said chamber, as set forth.

5. The combination of the fixed casing, the revolving drum mounted therein and having an annular butter-receiving chamber $o$, the cream-disturber within said drum, whereby the butter is separated from the milk, the adjustable butter-removing tube $p$, mounted rotatively in the bottom of the casing, with its axis parallel with the axis of the drum, and its receiving end bent laterally and entering the butter-receiving chamber, and the handle $q$, whereby said tube may be rotated axially, as set forth.

6. The combination, with the casing $b$ and its cover, provided with an undercut guide $k^2$, of the trundle-wheel, its shaft $j$, the operating-lever $k$, fulcrumed in the cover of the casing and provided with a screw-threaded stem, a sliding piece $k^4$ on said stem, which takes under the overhanging portion of said guide, and the socketed handle portion $k^5$ of the lever screwed onto the stem of said lever, whereby a brake is formed for holding the lever in any desired position, as set forth.

In witness whereof I have hereunto signed my name in the presence of two subscribing witnesses.

CARL AUGUST JOHANSSON.

Witnesses:
NERE A. ELFWING,
ERNST SVANGVIST.